United States Patent [19]
Kronenberg

[11] 3,871,916
[45] Mar. 18, 1975

[54] NONAQUEOUS CELL UTILIZING A 3ME2OX-BASED ELECTROLYTE

[75] Inventor: Marvin L. Kronenberg, Cleveland Heights, Ohio

[73] Assignee: Union Carbide Corporation, New York, N.Y.

[22] Filed: Apr. 22, 1974

[21] Appl. No.: 462,792

[52] U.S. Cl............................ 136/6 LN, 136/100 R
[51] Int. Cl. ......................................... H01m 35/00
[58] Field of Search............ 136/6 LN, 100 R, 83 R, 136/154, 155

[56] References Cited
UNITED STATES PATENTS

| | | |
|---|---|---|
| 3,514,337 | 5/1970 | Brauer et al. ................... 136/100 R |
| 3,536,532 | 10/1970 | Watanabe et al. ................ 136/83 R |
| 3,547,703 | 12/1970 | Blomgien et al. ................ 136/155 X |
| 3,686,038 | 8/1972 | Garth ............................. 136/154 X |
| 3,700,502 | 10/1972 | Watanabe et al. ........... 136/100 R X |

Primary Examiner—John H. Mack
Assistant Examiner—C. F. Lefevour
Attorney, Agent, or Firm—Cornelius F. O'Brien

[57] ABSTRACT

A nonaqueous cell utilizing a highly active metal anode, such as lithium, a solid $(CF_x)_n$ cathode and a liquid organic electrolyte based on 3-methyl-2-oxazolidone in combination with a low viscosity cosolvent, such as tetrahydrofuran, and a metal salt selected from the group consisting of $MBF_4$, $MClO_4$ and $MM'F_6$ wherein M is lithium, sodium or potassium and M' is phosphorus, arsenic or antimony.

13 Claims, No Drawings

NONAQUEOUS CELL UTILIZING A 3ME2OX-BASED ELECTROLYTE

FIELD OF THE INVENTION

This invention relates to a nonaqueous cell utilizing a highly active metal anode, a solid $(CF_x)_n$ cathode and a liquid organic electrolyte based on 3-methyl-2-oxazolidone in conjunction with a low viscosity cosolvent and a selected solute.

BACKGROUND OF THE INVENTION

The development of high energy battery systems requires the compatibility of an electrolyte possessing desirable electrochemical properties with highly reactive anode materials, such as lithium, sodium and the like, and the efficient use of high energy density cathode materials, such as fluorinated carbon. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate nonaqueous organic solvent. Conventional solvents include propylene carbonate, ethylene carbonate or γ-butyrolactone. The term "Periodic Table" as used herein refers to the Periodic Table of the Elements as set forth on the inside back cover of the Handbook of Chemistry and Physics, 48th Edition, The Chemical Rubber Co., Cleveland, Ohio, 1967–1968.

A multitude of solutes is known and recommended for use but the selection of a suitable solvent has been particularly troublesome since many of those solvents which are used to prepare electrolytes sufficiently conductive to permit effective ion migration through the solution, are reactive with the highly reactive anodes described above. Most investigators in this area, in search of suitable solvents, have concentrated on aliphatic and aromatic nitrogen- and oxygen-containing compounds with some attention given to organic sulfur-, phosphorus- and arsenic-containing compounds. The results of this search have not been entirely satisfactory since many of the solvents investigated still could not be used effectively with extremely high energy density cathode materials, such as fluorinated carbon, and were sufficiently corrosive to lithium anodes to prevent efficient performance over any length of time.

U.S. Pat. No. 3,547,703 to Blomgren, et al., discloses the use of a nonaqueous battery electrolyte employing a solute dissolved in ethylene glycol sulfite. U.S. Pat. Nos. 3,536,532 and 3,700,502 disclose nonaqueous cells employing solid fluorinated carbon $[(CF_x)_n]$ as the active cathode material in conjunction with a light metal anode and a conventional nonaqueous electrolyte.

In an article appearing in Abstracts of the Third International Conference on Nonaqueous Solvents, July 5–7, 1972, Michigan State University, an abstract by H. L. Hoffman, Jr. and P. G. Sears discloses that 3-methyl-2-oxazolidone has been found to be a good nonaqueous solvent because of its ease of synthesis and purification, stability, attractive physical properties, broad dissolving power and coordinating ability. The article mainly related to the disclosure that the basic physical and chemical characteristics of 3-methyl-2-oxazolidone qualified it as a good potential nonaqueous solvent.

While the theoretical energy, i.e., the electrical energy potentially available from a selected anode-cathode couple, is relatively easy to calculate, there is a need to choose a nonaqueous electrolyte for such couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts, a cathode, an anode and an electrolyte, and it is to be understood that the parts of one cell are not predictably interchangeable with parts of another cell to produce an efficient and workable cell.

It is an object of the present invention to provide a nonaqueous cell employing among other components a liquid organic electrolyte based on 3-methyl-2-oxazolidone in combination with a low viscosity cosolvent and a solute.

It is a further object of the present invention to provide a nonaqueous cell which utilizes a highly active metal anode, a solid $(CF_x)_n$ cathode and a liquid organic electrolyte based on 3-methyl-2-oxazolidone in combination with a low viscosity cosolvent and a solute.

It is a further object of the invention to provide an electrolyte solvent system for nonaqueous solid $(CF_x)_n$ cathode cells which comprises 3-methyl-2-oxazolidone in combination with a low viscosity cosolvent and a solute.

It is a further object of this invention to provide a nonaqueous cell which utilizes a highly active metal anode, a solid $(CF_x)_n$ cathode and a liquid organic electrolyte based on 3-methyl-2-oxazolidone in combination with a low viscosity cosolvent and a solute that will yield a cathode efficiency above about 50% and preferably above about 80% during discharge as based on a drain of 1 ma/cm$^2$ to 1.5 volt cutoff using a lithium anode cell.

SUMMARY OF THE INVENTION

The invention provides a novel high energy density nonaqueous cell comprising a highly active metal anode, a solid $(CF_x)_n$ cathode and a liquid organic electrolyte based on 3-methyl-2-oxazolidone in combination with at least one low viscosity cosolvent and a conductive solute.

Highly active metal anodes suitable for this invention include lithium (Li), potassium (K), sodium (Na), calcium (Ca), magnesium (Mg) and their alloys. Of these active metals, lithium would be preferred because in addition to being a ductile, soft metal that can easily be assembled in a cell, it possesses the highest energy-to-weight ratio of the group of suitable anode metals.

Cathodes for use in this invention are the solid fluorinated carbon electrodes which are represented by the formula $(CF_x)_n$ wherein x varies between about 0.5 and about 1.2, and wherein n refers to the number of monomer units which can vary widely. These electrodes are composed of carbon and fluorine, said carbon including graphitic and non-graphitic forms of carbon, such as coke, charcoal or active carbon. As disclosed in U.S. Pat. Nos. 3,536,532 and 3,700,502, solid fluorinated carbon electrodes are extremely stable and resistive to chemicals over the range of values from $x$ from 0 to about 1. Preferably, $(CF_x)_n$ cathodes wherein $x$ varies between about 0.8 and about 1.1 would be admirably suited for use with the specific electrolyte of the invention because this range represents the best combination of available energy density and conductivity of the cathode materials.

Liquid organic 3-methyl-2-oxazolidone material, (3Me2Ox),

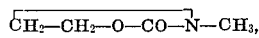

$\overline{CH_2-CH_2-O-CO-N}-CH_3$, is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution becomes too high for its efficient use as an electrolyte for nonaqueous cell applications. Thus in accordance with this invention, the addition of a low viscosity cosolvent is necessary if 3Me2Ox is to be used as an electrolyte for nonaqueous cells which can operate or perform at a high energy density level. Specifically, in order to obtain a high energy density level in accordance with this invention, it is essential to use a $(CF_x)_n$ cathode along with a highly active metal anode. Thus this invention is directed to a novel high energy density cell having a highly active metal anode, such as lithium, a $(CF_x)_n$ cathode wherein $x$ varies between about 0.5 and 1.2, and an electrolyte comprising 3Me2Ox in combination with a low viscosity cosolvent and a conductive solute. The $(CF_x)_n$ cathode efficiency, as based on the percentage of the theoretical capacity of the $(CF_x)_n$ material available in a cell operating on a drain of 1 milliampere per square centimeter to a 1.5 volt cutoff using a lithium anode, will be above about 50% and preferably above about 80% according to this invention.

The low viscosity cosolvents for use in this invention include tetrahydrofuran (THF), dioxolane, dimethoxyethane (DME), dimethyl isoxazole (DMI), diethyl carbonate (DEC), ethylene glycol sulfite (EGS), dioxane, dimethyl sulfite (DMS) or the like. Tetrahydrofuran and dioxolane are preferred cosolvents because of their compatibility with metal salts dissolved in liquid 3Me2Ox and their chemical inertness to cell components. Specifically, the total amount of the low viscosity cosolvent added should be between about 20% and about 80% based on total solvent volume, i.e., exclusive of solute, so as to lower the viscosity to a level suitable for use in a cell.

Conductive solutes (metal salts) for use in this invention with the liquid 3Me2Ox may be selected from the group $MBF_4$, $MClO_4$ and $MM'F_6$ wherein M is lithium, sodium or potassium, and M' is phosphorus, arsenic or antimony. The addition of the solute is necessary to improve conductivity of 3Me2Ox so that said 3Me2Ox can be used as the electrolyte in nonaqueous cell applications. Thus the particular salt selected has to be compatible and non-reactive with 3Me2Ox and the electrodes of the cell. The amount of solute to be dissolved in the liquid 3Me2Ox should be sufficient to provide good conductivity, e.g., at least about $10^{-4}$ ohm$^{-1}$ cm$^{-1}$. Generally an amount of at least about 0.5 M would be sufficient for most cell applications.

The present invention of a high energy density cell with a 3Me2Ox-based electrolyte, a solid $(CF_x)_n$ cathode and a highly active metal anode will be further illustrated in the following examples.

EXAMPLE I

The viscosity of several samples of 3Me2Ox, with and without a conductive solute and/or a low viscosity cosolvent, were obtained using a Cannon-Fenske viscometer. The data obtained are shown in Table 1 and clearly demonstrate the high viscosity of a solution of 3Me2Ox containing a dissolved conductive solute. As shown in sample 2, when one mole of $LiClO_4$ is added to one liter of 3Me2Ox, the viscosity of the solution was found to be 6.61 centistokes. In sample 6, when one mole of the same metal salt, $LiClO_4$, was added to one liter of equal parts of 3Me2Ox and tetrahydrofuran (THF), the viscosity of the solution was found to be only 2.87. Thus it is clearly shown that the viscosity of a solution of 3Me2Ox and a metal salt can be decreased by the addition of a specifically selected low viscosity cosolvent.

Table 1

| Sample | Solvent and Salt | Viscosity (Centistokes) |
|---|---|---|
| 1 | 3Me2Ox; no salt | 2.16 |
| 2 | 3Me2Ox; 1 M LiClO$_4$ | 6.61 |
| 3 | 3Me2Ox; 1 M LiBr | 7.58 |
| 4 | 50–50 3Me2Ox, THF; no salt | 1.05 |
| 5 | 50–50 3Me2Ox, THF; 1 M LiAsF$_6$ | 3.59 |
| 6 | 50–50 3Me2Ox, THF; 1 M LiClO$_4$ | 2.87 |
| 7 | 25–75 3Me2Ox, THF; 1 M LiAsF$_6$ | 2.08 |
| 8 | 25–75 3Me2Ox, dioxolane; 1 M LiAsF$_6$ | 1.83 |
| 9 | 25–75 3Me2Ox, THF; 1 M LiClO$_4$ | 1.99 |

EXAMPLE II

Each of eight flat-type cells was constructed utilizing a nickel metal base having a five square centimeter area shallow depression into which the cell contents were placed and then a nickel metal cap was placed on top before sealing the cell. The contents of each sample cell consisted of a five square centimeter lithium disc, 0.05 cm. thick and consisting of five sheets of lithium foil, about 4 ml of a specific electrolyte as shown in Table 2, a five square centimeter porous polypropylene separator which absorbed some of the electrolyte, a solid compressed $(CF_x)_n$ cathode which was prepared by grinding and mixing together 1.0 gram of $(CF_x)_n$ material having an $x$ value between 0.85 to 1.0 and 0.2 gram of an active carbon black material and then molding the mixture into a five square centimeter layer approximately 0.125 cm. thick, and a porous cathode collector measuring five square centimeters in area. The total thickness of the anode, cathode, cathode collector and separator for each cell measured about 0.3 centimeter. On a 0.6 milliampere per square centimeter drain to a 1.0 volt cutoff, the open circuit voltage, average discharge voltage and discharge capacity to 1.0 volt cutoff were obtained for each cell and are shown in Table 2. Since the cells were cathode-limited, the cathode efficiency was calculated as a percentage based on the theoretical capacity of the cathode material available in each cell.

For example, the theoretical efficiency of CF (x=1) as a cathode material in a lithium anode cell discharging at a 1 milliampere per square centimeter drain to a 1.5 volt cutoff, is calculated as follows: Assuming the reaction: 6.94gLi + 31gCF → 25.94gLiF + 12gC (1 equiv. wt.) (1 equiv. wt.) (1 equiv. wt.) (1 equiv. wt.) then if 1 gram (g) CF is used, the fraction of the equivalent weight is 1/31. Since one Faraday of electricity is obtained from one equivalent weight, then the AH per equivalent weight is calculated as follows:

(96.500 coulombs/Faraday/3600 coulombs/AH) = 26.8 AH/equivalent weight. Therefore, 1/31 equivalent weight x 26.8 AH/equivalent weight = 0.864 AH. This 0.864 AH or 864 mAH is the theoretical capacity of 1 gram of CF material when used as a cathode in a lithium anode cell and, by using this value as a reference, the cathode efficiency of $(CF_x)_n$ material can be calculated when used as a cathode in a cell having various electrolytes.

As demonstrated by the test data shown in Table 2, the discharge capacity and cathode efficiency of the cells containing a cosolvent (samples 1–6) were much higher than the discharge capacity and cathode efficiency of the cells that did not contain a cosolvent. The cathode efficiency of over 100% for samples 1 to 3 is believed due to the use of the active carbon black material which is a very active carbon and has been observed in previous nonaqueous cell systems to contribute to the capacity of the cell during discharge of other type cathode materials below 1.5 volts.

II except that the cutoff voltage was 1.5 volts instead of 1 volt. The discharge capacity and cathode efficiency observed for each cell are shown in Table 3 and clearly illustrate the high cathode utilization obtainable from $(CF_x)_n$ cathodes when using an electrolyte based on 3Me2Ox in combination with a selected low viscosity cosolvent and a selected salt. The test data in Table 3 also demonstrates that tetrahydrofuran and dioxolane are the preferred low viscosity cosolvents for use in the nonaqueous cells of this invention. The test data also indicate that not all the cosolvents will work efficiently with all solutes and consequently one has to select a particular cosolvent and a particular solute to yield a high efficiency combination when employed in a cell along with 3Me2Ox, a solid $(CF_x)_n$ cathode and an active metal anode.

Table 3

| Sample | Electrolyte Solvent | Electrolyte Salt (1 Molar) | Discharge Capacity to 1.5v Cutoff (mAh) | Cathode Eff. % |
| --- | --- | --- | --- | --- |
| 1 | 50% 3Me2Ox-50% THF | LiAsF$_6$ | 777.6 | 90.0 |
| 2 | 50% 3Me2Ox-50% THF | LiAsF$_6$ | 806.4 | 93.3 |
| 3 | 50% 3Me2Ox-50% THF | LiAsF$_6$ | 813.6 | 96.8 |
| 4 | 50% 3Me2Ox-50% THF | LiClO$_4$ | 698.0 | 80.8 |
| 5 | 25% 3Me2Ox-75% THF | LiAsF$_6$ | 896.0 | 103.8 |
| 6 | 50% 3Me2Ox-50% Dioxolane | LiAsF$_6$ | 702.0 | 80.0 |
| 7 | 25% 3Me2Ox-75% Dioxolane | LiAsF$_6$ | 630.0 | 73.0 |
| 8 | 25% 3Me2Ox-75% DME | LiAsF$_6$ | 54.0 | 6.2 |
| 9 | 50% 3Me2Ox-50% THF | LiPF$_6$ | 0.0 | 0.0 |
| 10 | 50% 3Me2Ox-50% DEC | LiAsF$_6$ | 216.0 | 25.0 |

EXAMPLE IV

Nineteen flat-type cells were constructed as described in Example II, using the same cell components for each cell except that the electrolyte employed in each cell is as shown in Table 4 and the $(CF_x)_n$ cathode was obtained commercially from Eagle-Picher Industries, Inc. Each of the cathodes was made of a mixture of 80 wt. % $(CF_{1.0})_n$, 10% carbon black, 5% hydroxyethylcellulose (HEC) and 5% Solka-Floc (Brown Company's trade name for a fibrous highly purified cellulose material) pressed into an expanded nickel screen. The hydroxyethylcellulose and Solka-Floc additives were included to serve as binders and bulking agents, respectively, for the active and conductive materials.

Each of the cells was tested as in Example II except

Table 2

| Sample | Electrolyte-Solvent | Electrolyte Salt | O.C.V. (Volt) | Avg. Disch. (Volt) | Disch. Cap. to 1.0V Cutoff (mAh) | Cathode Eff. % |
| --- | --- | --- | --- | --- | --- | --- |
| 1 | 50 vol.%(v/o) 3Me2Ox-50 v/o THF | 1 M LiAsF$_6$ | 3.28 | 2.10 | 972 | 112.0 |
| 2 | 50 v/o 3Me2Ox 50 v/o THF | 1 M LiAsF$_6$ | 3.20 | 2.14 | 936 | 108.0 |
| 3 | 25 v/o 3Me2Ox 75vo THF | 1 M LiAsF$_6$ | 3.24 | 2.35 | 1064 | 135.0 |
| 4 | 50 v/o 3Me2Ox 50 v/o dioxolane | 1 M LiAsF$_6$ | 3.28 | 2.05 | 810 | 94.0 |
| 5 | 25 v/o 3Me2Ox 75 v/o dioxolane | 1 M LiAsF$_6$ | 3.08 | 2.10 | 630 | 73.0 |
| 6 | 50 v/o 3Me2Ox 50 v/o THF | 1 M LiClO$_4$ | 3.05 | 2.18 | 738 | 85.5 |
| 7 | 3Me2Ox | 1 M LiBr | 2.85 | 1.85 | 54 | 6.1 |
| 8 | 3Me2Ox | 1 M LiClO$_4$ | 3.20 | 2.02 | 90 | 10.4 |

EXAMPLE III

Ten flat type cells were constructed as described in Example II, using the same cell components except that the electrolyte employed in each cell is as shown in Table 3. Each cell was tested as described in Example that the discharge data were obtained using a 1mA/cm$^2$ drain to a 1.5 volt cutoff. The cathode efficiency data for each cell are shown in Table 4 and again illustrates the high cathode utilization that is obtainable with $(CF_x)_n$ cathodes in nonaqueous systems when using a liquid organic electrolyte based on 3Me2Ox in combination with at least one selected low viscosity cosolvent and a selected metal salt. It is also demonstrated from the data in Table 4 that tetrahydrofuran and dioxolane are the preferred low viscosity cosolvents for use in the nonaqueous cells of this invention. Again the test data also indicates that not all the cosolvents will work effectively with all solutes and consequently one has to select a particular cosolvent and a particular solute which will yield a high efficiency combination when employed in a cell along with 3Me2Ox, a solid $(CF_x)_n$ cathode and an active metal anode.

Table 4

| Sample | Electrolyte Solvent | Electrolyte Salt (Molar) | Cathode Eff. (%) |
|---|---|---|---|
| 1 | 50% 3Me2Ox-50% THF | 1MLiAsF$_6$ | 100.9 |
| 2 | 50% 3Me2Ox-50% THF | 1MLiClO$_4$ | 87.3 |
| 3 | 25% 3Me2Ox-75% THF | 0.5MLiClO$_4$ | 98.2 |
| 4 | 25% 3Me2Ox-75% THF | 0.5MLiAsF$_6$ | 87.3 |
| 5 | 25% 3Me2Ox-75% EGS | 1MLiAsF$_6$ | 23.9 |
| 6 | 25% 3Me2Ox-75% EGS + trace DMI | 1MLiAsF$_6$ | 22.7 |
| 7 | 25% 3Me2Ox-25% EGS - 50% THF | 1MLiAsF$_6$ | 34.1 |
| 8 | 25% 3Me2Ox-25% EGS - 50% THF | 1 MLiClO$_4$ | 45.5 |
| 9 | 60% 3Me2Ox-40% Dioxolane | 1MLiClO$_4$ | 50.5 |
| 10 | 60% 3Me2Ox-40% Dioxolane | 1MKAsF$_6$ | 73.1 |
| 11 | 30% 3Me2Ox-30% EGS-40% Dioxolane | 1.5MKAsF$_6$ | 24.1 |
| 12 | 30% 3Me2Ox-30% EGS-40% Dioxolane | 0.5MKAsF$_6$ | 27.3 |
| 13 | 60% 3Me2Ox-40% m-Dioxane | 1MLiClO$_4$ | 30.8 |
| 14 | 25% 3Me2Ox-75% Dioxolane | 1MLiClO$_4$ | 72.1 |
| 15 | 60% 3Me2Ox-40% Dioxolane | 1MKAsF$_6$ | 92.3 |
| 16 | 80% 3Me2Ox-20% Dioxolane | 1MKAsF$_6$ | 1.2 |
| 17 | 80% 3Me2Ox-20% Dioxolane | 1MLiClO$_4$ | 16.0 |
| 18 | 30% 3Me2Ox-30% DMS-40% Dioxolane | 1MLiClO$_4$ | 91.4 |
| 19 | 20% 3Me2Ox-40% DMS-40% Dioxolane | 1MLiBF$_4$ | 103.0 |

EXAMPLE V

Each of four jelly roll construction sealed cells, sub-C size, was made using a lithium anode, a polypropylene separator, a $(CF_x)_n$ cathode made of 80 wt. % $(CF_{1.0})_n$ material, 10% carbon black and 10% "Teflon" binder ("Teflon" is duPont's trade name for polytetrafluoroethylene), and an electrolyte as shown in Table 5. The anode, separator and cathode were rolled up in a jelly-roll fashion with the anode on the outside of the rolled assembly and then inserted in a sub-C size nickel-plated steel cylindrical can containing the electrolyte. On a 1mA/cm$^2$ continuous discharge drain to a 1.5 volt cutoff, the discharge capacity and cathode efficiency were obtained for each cell and are shown in Table 5. Again these data illustrate that high cathode utilization can be obtained with $(CF_x)_n$ cathodes in nonaqueous systems when using a liquid organic electrolyte based on 3Me2Ox in conjunction with a selected low viscosity cosolvent and a selected metal salt.

Table 5

| Electrolyte | | Discharge Capacity (Ah) | Cathode Efficiency (%) |
|---|---|---|---|
| Solvent | Solute | | |
| 60 v/o 3Me2Ox 40 v/o THF | 1M LiAsF$_6$ | 2.217 | 83.4 |
| 60 v/o 3Me2Ox 40 v/o THF | 1 M LiClO$_4$ | 2.199 | 82.7 |
| 60 v/o 3Me2Ox 40 v/o dioxolane | 1 M LiAsF$_6$ | 2.379 | 89.4 |
| 60 v/o 3Me2Ox 40 v/o dioxolane | 1 M LiClO$_4$ | 2.510 | 94.4 |

While the present invention has been described with reference to many particular details thereof, it is not intended that these details shall be construed as limiting the scope of this invention.

What is claimed is:

1. A nonaqueous cell comprising a highly active metal anode, a solid $(CF_x)_n$ cathode wherein $x$ is between about 0.5 and about 1.2, and a liquid organic electrolyte consisting essentially of 3-methyl-2-oxazolidone in combination with at least one low viscosity cosolvent and a conductive solute.

2. The nonaqueous cell of claim 1 wherein $x$ is between about 0.8 and about 1.1.

3. The nonaqueous cell of claim 1 wherein said low viscosity cosolvent is selected from the group consisting of tetrahydrofuran, dioxolane, dimethoxyethane, dimethyl isoxazole, diethyl carbonate, ethylene glycol sulfite, dioxane and dimethyl sulfite.

4. The nonaqueous cell of claim 1 wherein said conductive solute is selected from the group consisting of MBF$_4$, MClO$_4$ and MM'F$_6$ wherein M is lithium, sodium or potassium and M' is phosphorus, arsenic or antimony.

5. The nonaqueous cell of claim 1 wherein said active metal anode is selected from the group consisting of lithium, potassium, sodium, calcium, magnesium and alloys thereof.

6. The nonaqueous cell of claim 3 wherein said conductive solute is selected from the group consisting of MBF$_4$, MClO$_4$ and MM'F$_6$ wherein M is lithium, sodium or potassium and M' is phosphorus, arsenic or antimony.

7. The nonaqueous cell of claim 4 wherein said low viscosity cosolvent is selected from the group consisting of tetrahydrofuran, dioxolane, dimethoxyethane, dimethyl isoxazole, diethyl carbonate, ethylene glycol sulfite, dioxane and dimethyl sulfite.

8. The nonaqueous cell of claim 6 wherein said active metal anode is selected from the group consisting of lithium, potassium, sodium, calcium, magnesium and alloys thereof.

9. The nonaqueous cell of claim 7 wherein said active metal anode is selected from the group consisting of lithium, potassium, sodium, calcium, magnesium and alloys thereof.

10. The nonaqueous cell of claim 1 wherein said active metal anode is lithium, said low viscosity cosolvent is tetrahydrofuran and said conductive solute is selected from the group consisting of LiClO$_4$, LiAsF$_6$ and KAsF$_6$.

11. The nonaqueous cell of claim 1 wherein said active metal anode is lithium, said low viscosity cosolvent is dioxolane, and said conductive solute is selected from the group consisting of $LiClO_4$, $LiAsF_6$ and $KAsF_6$.

12. The nonaqueous cell of claim 10 wherein said solute is $KAsF_6$.

13. The nonaqueous cell of claim 11 wherein said solute is $KAsF_6$.

* * * * *